(12) United States Patent
Shkolnikov et al.

(10) Patent No.: US 11,131,608 B2
(45) Date of Patent: Sep. 28, 2021

(54) ANALYTE EXTRACTION

(71) Applicant: Hewlett-Packard Development Company, L.P., Houston, TX (US)

(72) Inventors: Viktor Shkolnikov, Palo Alto, CA (US); Anita Rogacs, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 227 days.

(21) Appl. No.: 15/756,965

(22) PCT Filed: Oct. 23, 2015

(86) PCT No.: PCT/US2015/057044
§ 371 (c)(1),
(2) Date: Mar. 1, 2018

(87) PCT Pub. No.: WO2017/069769
PCT Pub. Date: Apr. 27, 2017

(65) Prior Publication Data
US 2018/0259433 A1    Sep. 13, 2018

(51) Int. Cl.
*G01N 1/40* (2006.01)
*G01N 21/65* (2006.01)
*B01D 61/38* (2006.01)

(52) U.S. Cl.
CPC ........... *G01N 1/4005* (2013.01); *B01D 61/38* (2013.01); *G01N 21/658* (2013.01);
(Continued)

(58) Field of Classification Search
CPC ............... G01N 1/4005; G01N 21/658; G01N 2001/4011; G01N 2001/4038; G01N 61/38; B01D 61/38; B01D 2313/345
See application file for complete search history.

(56) References Cited

U.S. PATENT DOCUMENTS 8,137,523 B2   3/2012   Cho et al.
8,390,806 B1 * 3/2013   Subramanian ........ G01J 3/0259
                                              356/328
(Continued)

FOREIGN PATENT DOCUMENTS

CN      1249697      4/2000
CN      1863737     11/2006
(Continued)

OTHER PUBLICATIONS

Ng et al (DC biased AC electrokinetics: a conductivity gradient driven fluid flow, Lab on a Chip, 2011, 4, pp. 4241-4247). (Year: 2011).*

(Continued)

*Primary Examiner* — Lyle Alexander
*Assistant Examiner* — Jean Caraballo-Leon
(74) *Attorney, Agent, or Firm* — Rathe Lindenbaum LLP

(57) ABSTRACT

A target analyte is extracted out of a sample fluid in a sample fluid passage by diffusing the target analyte through a supported liquid membrane to a product fluid passage. Extraction of the target analyte is accelerated by applying an electric field across and perpendicular to the supported liquid membrane with electrodes. Passage of selected ions across an exchange membrane extending between one of the electrodes and the supported liquid membrane is inhibited.

23 Claims, 4 Drawing Sheets

(52) U.S. Cl.
CPC ............... *B01D 2313/345* (2013.01); *G01N 2001/4011* (2013.01); *G01N 2001/4038* (2013.01)

(56) References Cited

U.S. PATENT DOCUMENTS

| | | | |
|---|---|---|---|
| 8,487,243 | B2 | 7/2013 | Whitehouse et al. |
| 8,961,769 | B2 | 2/2015 | Garde et al. |
| 9,097,676 | B2 | 8/2015 | Meinhart et al. |
| 2002/0121444 | A1 | 9/2002 | Lee et al. |
| 2004/0023091 | A1 | 2/2004 | Wilkinson et al. |
| 2006/0124459 | A1* | 6/2006 | Strand ............... C07K 1/26 204/450 |
| 2007/0284254 | A1* | 12/2007 | Oho ................ B03C 5/005 204/547 |
| 2010/0072066 | A1* | 3/2010 | Pedersen-Bjergaard ............ B01D 61/38 204/540 |
| 2011/0027901 | A1* | 2/2011 | Gaster ............... G01N 27/745 436/149 |
| 2011/0120870 | A1* | 5/2011 | Kruger ............... B01D 61/04 204/518 |
| 2012/0262718 | A1* | 10/2012 | Yamada ............... G01N 21/554 356/436 |
| 2013/0327647 | A1 | 12/2013 | Ohira et al. |
| 2014/0141424 | A1* | 5/2014 | Pourahmadi ............ B01L 7/52 435/6.11 |
| 2014/0211196 | A1* | 7/2014 | Samuels ............... G01N 21/658 356/36 |
| 2015/0259225 | A1 | 9/2015 | Su |
| 2015/0291452 | A1 | 10/2015 | Jikihara et al. |

FOREIGN PATENT DOCUMENTS

| | | | |
|---|---|---|---|
| CN | 102066948 | | 5/2011 |
| CN | 102884430 | | 1/2013 |
| EP | 1907104 A | | 4/2008 |
| JP | 2016040547 A | * | 3/2016 ........... G01N 21/658 |
| WO | WO-9838503 | | 9/1998 |

OTHER PUBLICATIONS

Chen et al (Electrokinetically driven flow mixing utilizing chaotic electric fields, Microfluidics and Nanofluidics, 2008, 5, pp. 785-793) (Year: 2008).*

Dimitrov, V., et al. "Nanopores in solid-state membranes engineered for single molecule detection." Nanotechnology vol. 21. No. 6 (2010): 065502.

Jönsson, Jan Åke, et al. "Membrane-based techniques for sample enrichment." Journal of chromatography vol. A 902. No. 1 (2000): 205-225.

Parhi, P.K. "Supported Liquid Membrane Principle and Its Practices: A Short Review", Hindawi Publishing Corporation, Journal of Chemistry, vol. 2013, Article ID 618236, 11 pp.

* cited by examiner

ANALYTE EXTRACTION

BACKGROUND

Target analytes are often extracted from biological, chemical and environmental samples, such as blood, urine, cell cultures, food and drinks, pharmaceuticals and natural or artificial water sources.

DETAILED DESCRIPTION OF EXAMPLES

Biological, chemical and environmental samples, such as blood, urine, cell cultures, food and drinks, pharmaceuticals and natural or artificial water sources often contain small amounts of desired target analyte while containing a large amount of other chemical species that may interfere with the detection and quantification of target analytes. Extracting the target analytes from such samples is often complex, costly and associated with instances of human error. Such extraction may also involve the use of expensive and toxic waste-generating reagents.

Figure 1:
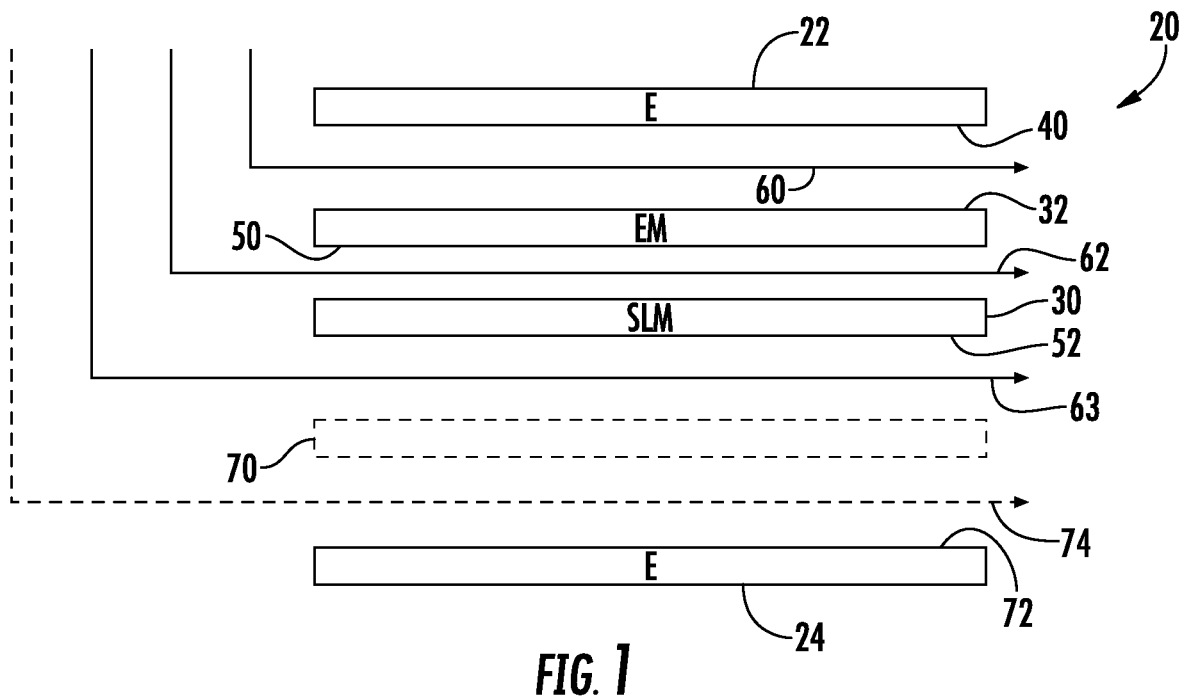
FIG. 1 is a schematic diagram of an example analyte extraction system.

FIG. 1 is a schematic diagram of an example analyte extraction system 20. Analyte extraction system 20 extracts target analytes from samples in an efficient and cost-effective manner. As will be described hereafter, analyte extraction system 20 utilizes a supported liquid membrane to provide tunable extraction characteristics. Electrodes are used to accelerate a rate of extraction across the supported liquid membrane.

As shown by FIG. 1, extraction system 20 comprises electrodes 22, 24, supported liquid membrane 30, exchange membrane 32, fluid passage 40, sample input passage 50 and product output passage 52. Electrodes 22, 24 extend on opposite sides of supported liquid membrane 30, sample input passage 50 and product output passage 52. Electrodes 22, 24 are to be electrically charged so as to form an electric field therebetween, the electric field extending substantially orthogonal to supported liquid membrane 30. Electrodes 22, 24 create an electric field perpendicular to the direction of flow of fluid along sample input passage 50 and product output passage 52 such that diffusion of a target analyte across supported liquid membrane 30 is accelerated.

Supported liquid membrane 30 extends between sample input passage 50 and product output passage 52. Support liquid membrane 30 comprises a microporous structure and an organic phase. The microporous structure serves as an inert microporous support for immobilizing the organic phase. The microporous structure is hydrophobic so as to retain the organic phase within pores of membrane 30 by capillary action.

The organic phase comprises an extractant and a diluent. The extractant comprises an organic solvent, sometimes with dissolved reagents, chosen based on what gases, ions or molecules are to be extracted from a feed liquid or sample fluid on one side of the membrane 30. In terms of the mechanism of extraction, the organic phase may comprise extraction by compound formation, an extraction by ion-pair formation or an extraction by solvation formation. The diluent dilutes or adjusts the concentration of the organic extractant. In one implementation, the diluent has a high dielectric constant and a low viscosity. The diluent reduces viscosity of the organic phase to facilitate diffusivity within the microporous structure. The diffusion properties of membrane 30 are adjustable by selection or replacement of the organic phase supported by microporous structure with a different organic phase having different diffusion properties. In one implementation, membrane 30 has selective transport functions that selectively allow the transport of a subset of ions (depending on its charge, size, etc), while inhibiting the passage of other ions.

Exchange membrane 32 comprises a charge selective, lipophilicity selective and/or a size selective membrane positioned between fluid passage 40 and sample input passage 50. Membrane 32 separates fluid passage 40 from sample input passage 50. Membrane 32 defines fluid passage 40 which contains a buffering solution 60. In one implementation, membrane 32 has selective transport functions that selectively allow the transport of a subset of ions (depending on its charge, size, etc), while inhibiting the passage of other ions. In one implementation, exchange membrane 32 comprises an anion exchange membrane. In another implementation, membrane 32 comprises a cation exchange membrane. Membrane 32 inhibits pH changes in the sample fluid 62 flowing within sample input passage 50 due to the hydrogen or hydroxide ions generated by electrode 22. Membrane 32 inhibits the transfer of bubbles generated at electrode 22 from transferring to the sample fluid 62 flowing within sample input passage 50.

Sample input passage 50 comprise a fluid passage defined between supported liquid membrane 30 and membrane 32. Sample input passage 50 directs a feed liquid or fluid sample between membrane 30 and 32. Product output passage 52 comprise a fluid passage defined between membrane 30 and electrode 24. Product output passage 52 guides and acceptor or product fluid 63 which receives target analyte and transports the target analyte.

As shown by broken lines, in some implementations, system 20 may comprise an additional membrane 70 between electrode 24 and membrane 30, wherein membrane 70 defines a fluid passage 72 through which a buffer solution 74 is directed. In such an implementation, membrane 70 and fluid passage 72 perform similar to membrane 32 and fluid passage 40, directing buffer solution 74 between the electrode 24 and product output passage 52 to inhibit pH changes in the product fluid 63 flowing within product output passage 52 due to the hydrogen or hydroxide ions generated by electrode 24. In such an implementation, membrane 70 inhibits the transfer of bubbles generated at electrode 24 from transferring to the product fluid 63 flowing within product output passage 52.

Figure 2:
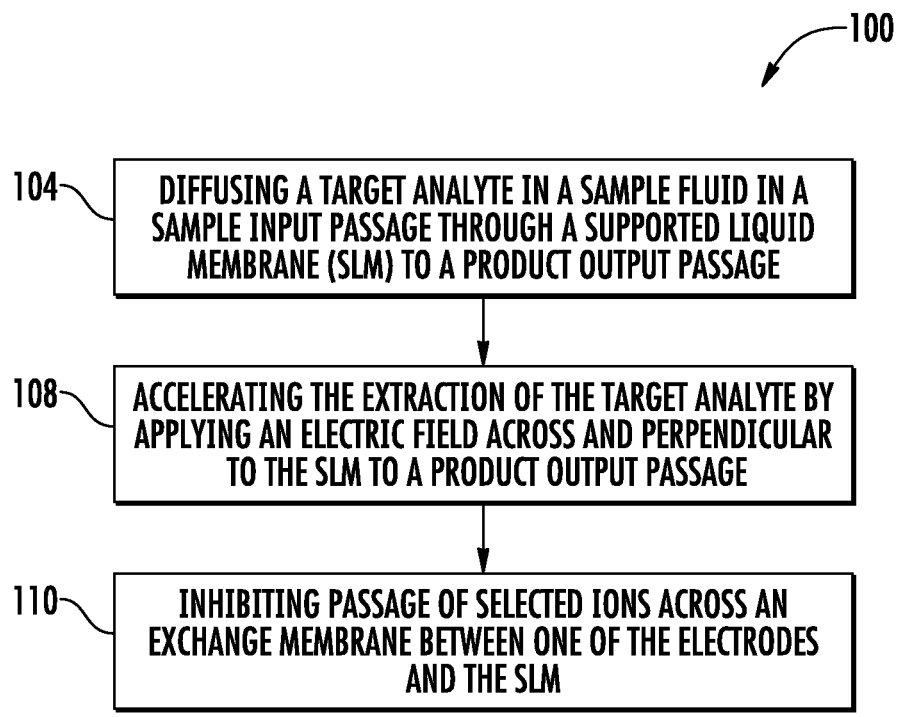
FIG. 2 is a flow diagram of an example method for extracting a target analyte from a sample.

FIG. 2 is a flow diagram of an example method 100 for extracting analyte from a sample. In one implementation, method 100 may be carried out using extraction system 20 shown in described with respect to FIG. 1 or any of the extraction systems described hereafter. As indicated by block 104, a target analyte is diffused from a sample fluid a sample input passage through a supported liquid membrane to a product output passage. In system 20, a sample fluid supplied through sample input passage 50 and is diffused through supported liquid membrane 30 to the product fluid 63 flowing within the product output passage 52.

As indicated by block 108, an electric field is applied across perpendicular to the supported liquid membrane to accelerate the extraction of the target analyte to the product output passage. In system 20, electrodes 22 and 24 form an electric field therebetween, perpendicular to support liquid membrane 30. The electric field accelerates the diffusion of the target analyte from the sample fluid 62 within sample input passage 50, across supported liquid membrane 30, to the product fluid 63 within the product output passage 52.

As indicated by block 110, the passage of selected ions is inhabited by a membrane between one of the electrodes and the supported liquid membrane. In system 20, membrane 32 and buffer solution 60 flowing within fluid passage 40 inhibit the passage of selected ions to sample fluid 62. As indicated in broken lines, in one implementation, membrane 70 and buffer solution 74 further inhibit the passage of selected ions to product fluid 63.

Figure 3:
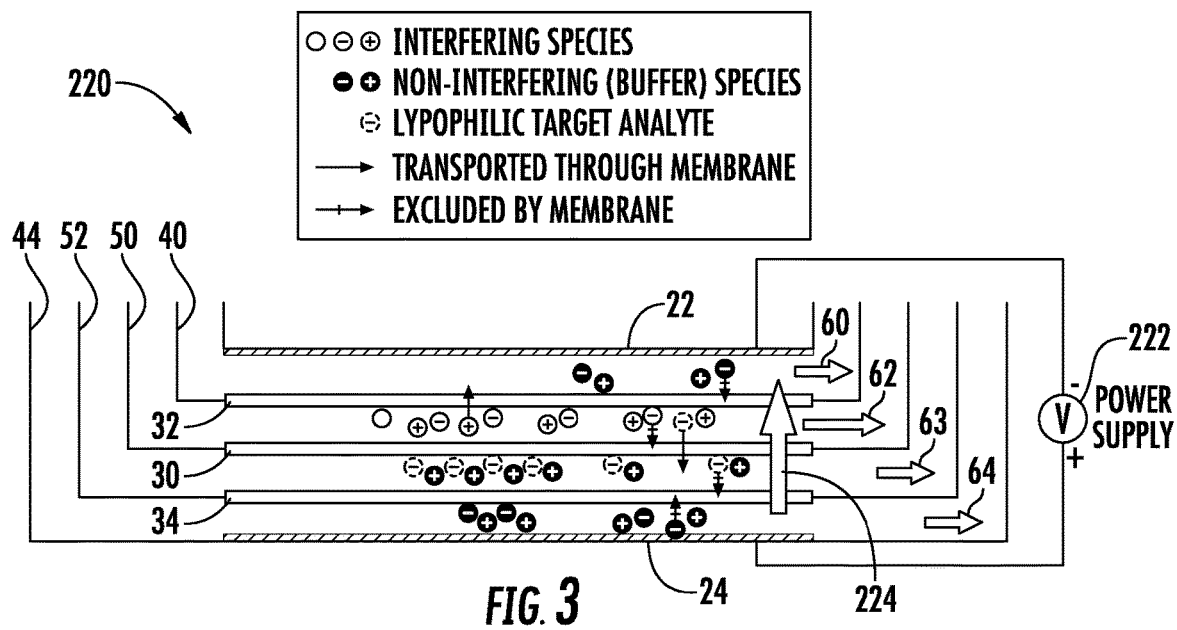
FIG. 3 is a schematic diagram of another example analyte extraction system.

FIG. 3 schematically illustrates extraction system 220, another example of extraction system 20. Extraction system 220 comprises electrodes 22, 24, supported liquid membrane 30, membrane 32, membrane 34, fluid passages 40, 44, sample input passage 50 and product output passage 52. Those components of system 220 which correspond to components of system 20 are numbered similarly.

In the example illustrated, electrodes 22, 24 are supplied with power from a power supply 222 so as to form an electric field 224 in the indicated direction. In the example illustrated, electrode 22 comprises a "pushing electrode" while electrode 24 serves as a "pulling" electrode. The electric field 224 formed by electrodes 22, 24 extends substantially orthogonal to supported liquid membrane 30. Electrodes 22, 24 create an electric field perpendicular to the direction of flow of fluid along sample input passage 50 and product output passage 52 such that diffusion of a target analyte across supported liquid membrane 30 is accelerated.

Membrane 32 extends between supported liquid membrane 30 and electrode 22, separating fluid passage 40 from sample input passage 50. In the example illustrated, membrane 32 comprises cation exchange membrane. Fluid passage 40 contains a buffer solution while sample input passage 50 directs flow of a sample fluid 62.

Membrane 34 extends between supported liquid membrane 30 and electrode 24, separating fluid passage 44 from product output passage 52. In the example illustrated, membrane 32 comprises a cation exchange membrane. Fluid passage 44 contains a buffer solution 64 while product output passage 52 directs flow of a product fluid 63.

FIG. 3 illustrates one example extraction process which extracts an anionic lipophilic analyte from an aqueous sample fluid 62 rich in (non-lipophilic) small salt ions (e.g., sodium, potassium and chloride ions) (interfering species). Buffer solutions 60 and 64 each contain various non-interfering (buffer) species. In the example illustrated, the pH of the buffer fluid 60 and 64 as well as product fluid 63 is alkaline. Because the pushing electrode 22 is a cathode, it electrolyzes water, producing hydroxide ions and hydrogen. Buffer solution 60, flowing within fluid passage 40, maintains the pH. Buffer solution 60 carries away dissolved oxygen generated on the surface of electrode 22 to reduce bubbles which would interfere with extraction. The flow rate of buffer solution 60 is tuned or controlled such that the capacity of buffer solution 60 to carry away dissolved oxygen and buffer generated hydroxide is not overcome.

As further shown by FIG. 3, membrane 32 further inhibits the passage of anions to sample fluid 62 within sample fluid passage 52. As a result, even if the buffer provided by buffer fluid 60 is defeated, membrane 32 inhibits hydroxide generated at electrode 22 from entering product fluid 63 within product output passage 52. At the same time, cations from the sample fluid 62 may freely pass through membrane 32 to balance the generated hydroxide and provide net neutrality in the buffer solution 60 within fluid passage 40.

The lipophilic anionic analyte within sample fluid 62 is driven by the electric field 224 through supported liquid membrane 30 into product fluid passage 52 and product fluid 63. Because of its lipophilic nature, the lipophilic anionic analyte is able to cross the lipophilic solvents inside the supported liquid membrane. Small non-lipophilic ions, such as chloride, are enabled to cross membrane 30 and remain in the sample fluid 62 within sample fluid passage 52.

In product fluid 63 within product output passage 52, the target analyte is further pulled towards the pulling electrode 24 (anode), but is inhibited from entering buffer solution 64 within fluid passage 44 by exchange membrane 34 which excludes anions. As a result, the lipophilic target analyte is concentrated in the product fluid 63 flowing through the product output passage 52. In one implementation, the flow rate of product fluid 63 through product output passage 52 is significantly slower than the flow rate of sample fluid 62 flowing within sample fluid passage 52 to further concentrate the target analyte. As with the flow of buffer solution 60, the flow of buffer solution 64 is tuned such that the capacity of buffer solution 64 to carry away dissolved gases and two buffer the product fluid from the redox reactions of electrode 24 is not overcome.

Figure 4:
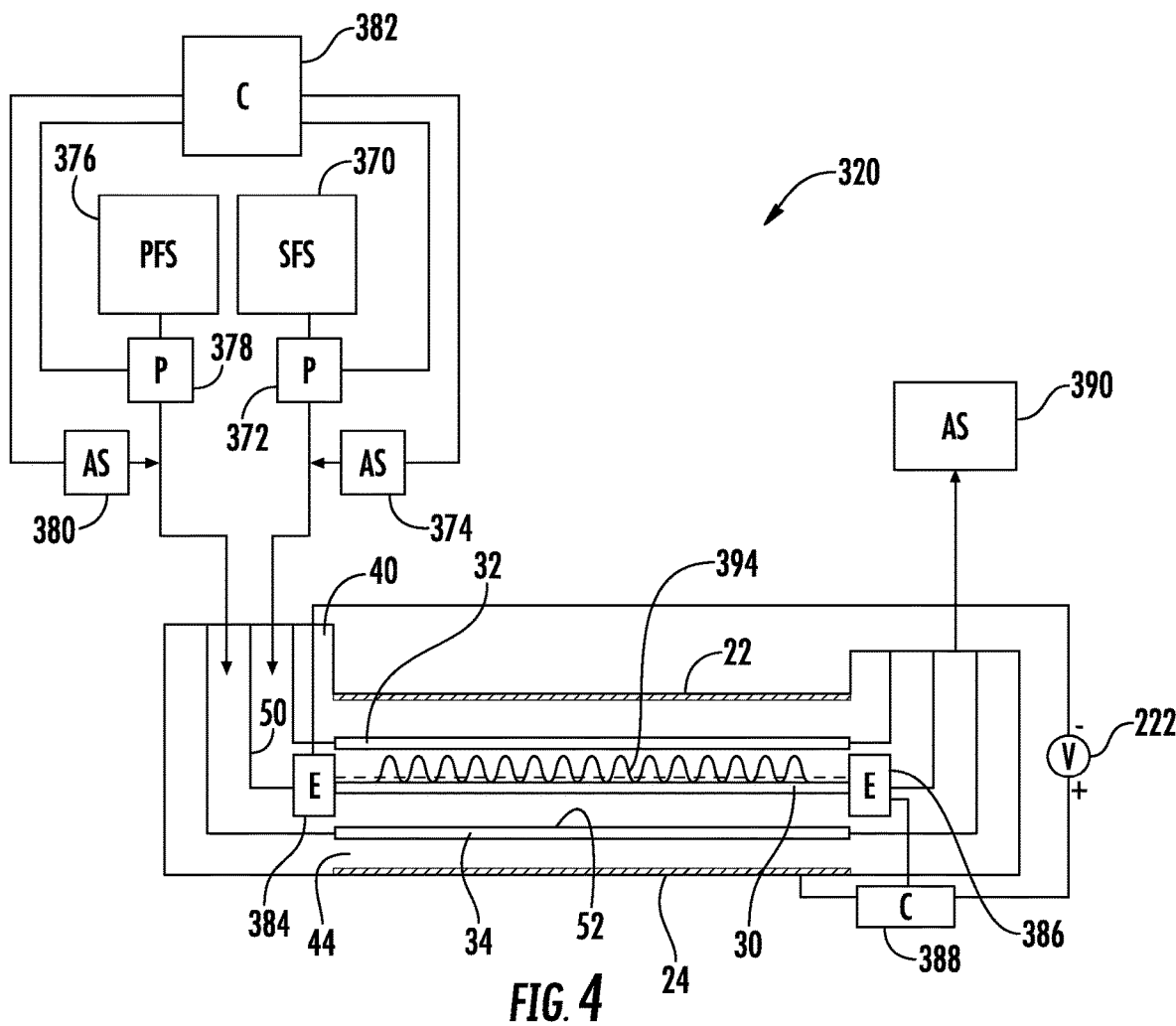
FIG. 4 is a schematic diagram of another example analyte extraction system.

FIG. 4 schematically illustrates extraction system 320, another example of extraction system 20. Extraction system 320 is similar to extraction system 220 except that extraction system 320 is illustrated as additionally comprising a sample fluid supply 370, pump 372, additive supply 374, product fluid supply 376, pump 378, additive supply 380, controller 382, electrodes 384, 386, controller 388 and analyte sensor 390. Those remaining components of system 320 which correspond to the system 220 are numbered similarly.

Sample fluid supply 370 comprises a supply of sample fluid, such as sample fluid 62 described above, to be tested or analyzed. Sample fluid supply 370 is connected to sample input passage 50. Pump 372 comprises a pump to move sample fluid from sample fluid supply 370 through sample input passage 50. In one implementation, pump 372 comprises an inertial pump. In one implementation, pump 372 comprises a thermo-resistive inertial pump that utilizes a resistor may vaporize adjacent fluid to create a bubble that collapses and draws fluid to fluid. In another implementation, pump 372 comprises a piezo-resistive pump. In other implementations, pump 372 may comprise other forms of pumping mechanisms. Although pump 372 is illustrated as being located on an upstream side of sample input passage 50 with respect to membrane 30 so as to push fluid, in other implementations, pump 372 may alternatively be located on a downstream side of sample input passage 50 with respect to membrane 30 so as to draw fluid.

Additive supply 374 comprise a supply of an additive that may be selectively added stream of fluid that is being pumped from sample fluid source 370. Such an additive may be utilized to adjust the pH of the sample fluid 62. Additive supply 374 comprises a valve that is selectively openable and closable to control when an additive is added to the fluid stream in the amount of additive added to the fluid stream. Through the addition of additives to the sample fluid stream, system 320 controls and adjusts extraction rate and characteristics.

Product fluid supply 376 comprises a supply of product fluid, such as product fluid 63 described above, which receives the removed or extracted analyte and transports the extracted analyte. Product fluid supply 76 is connected to product output fluid passage 52. Pump 378 comprises a pump to move sample fluid from product fluid supply 376 through product output fluid passage 52. In one implementation, pump 378 comprises an inertial pump. In one implementation, pump 378 comprises a thermo-resistive inertial pump that utilizes a resistor may vaporize adjacent fluid to create a bubble that collapses and draws fluid to fluid. In another implementation, pump 378 comprises a piezo-resistive pump. In other implementations, pump 378 may comprise other forms of pumping mechanisms. Although pump 378 is illustrated as being located on an upstream side of product output passage 52 with respect to membrane 30 so as to push fluid, in other implementations, pump 378 may alternatively be located on a downstream side of product output passage 52 with respect to membrane 30 so as to draw fluid.

Additive supply 380 comprise a supply an additive that may be selectively added stream of fluid that is being pumped from product fluid source 376. Additive supply 380 comprises a valve that is selectively openable and closable to control when an additive is added to the fluid stream and the amount of additive added to the fluid stream. Through the addition of additives to the product output stream, system 320 controls and adjusts extraction rate and characteristics.

Controller 382 comprises a processing unit that outputs control signals that control the operation of pumps 372, 378 to control the rate at which sample fluid and product fluid are moved through passages 50 and 52, respectively, along membrane 30. By controlling the ratio of product to sample flow rates, the concentration of the target analyte in the product fluid exiting product output passage 52 is controlled. In the example illustrated, controller 382 additionally outputs control signals controlling additive sources 374 and 380, controlling the timing and rate at which the valve mechanisms are opened and closed to control the amount of an additive pumped or otherwise moved into the sample fluid stream and the product fluid stream, respectively.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 382 may be embodied as part of one or more application-specific integrated circuits (ASICs). Unless otherwise specifically noted, the controller is not limited to any specific combination of hardware circuitry and software, nor to any particular source for the instructions executed by the processing unit.

Electrodes 384, 386 are located on opposite ends of membrane 30. Electrodes 384, 386 are used to form an electric field in a direction parallel to the major dimension of membrane 30. Controller 388 comprises a processing unit that outputs control signals to control the electric field formed between electrodes 384, 386. Controller 388 controls the establishment of an electric field between electrodes 384, 386 in response to command or input. Such electric fields may be actuated to remove and exchange the organic phase or solvent within membrane 30, facilitating use of a different solvent or organic phase within membrane 30 so as to provide system 320 with different analyte extraction characteristics. As a result, membrane 30 may be tuned for the particular target analyte to be extracted. In other implementations, electrodes 384, 386 may be omitted.

As further shown by FIG. 4, controller 388 further controls the electric field formed by electrodes 22 and 24, the electric field being perpendicular to the electric field formed by electrodes 384, 386. Controller 388 regulates the power supplied by power supply 222 such that electrodes 22, 24 apply an asynchronous electrical field 394 in a direction orthogonal to membrane 30, perpendicular to the direction of fluid flow along membrane 30. The asynchronous electric field 394 is tuned so as to produce vortices oscillating flow orthogonal to membrane 30. The vortices produced by electric field 394 facilitate mixing of the sample fluid along sample input passage 50 so as to constantly bring new portions of the sample fluid flowing through sample input passage 50 (possibly having a greater concentration of the target analyte as compared to the sample fluid already residing along the boundary of membrane 30 from which target analyte has already been extracted) into proximity with the surface or boundary of membrane 30. The vortices created by the asynchronous electric field mix the sample fluid within sample input passage 50 to enhance the rate or efficiency at which the target analyte is diffused through membrane 30 to product output passage 52. In one implementation, controller 388 outputs control signals causing electrodes 22, 24 to form an alternating current electrical field with a direct current (DC) offset. In one implementation, controller 388 adjusts a magnitude, frequency and/or waveform of the oscillating electric field formed by electrodes 22, 24 to adjust the rate at which the vortices are created and the rate at which the sample fluid is mixed along the boundary of membrane 30. For example, in one implementation, different waveforms of an electric field, such as square and triangular waveforms, may be applied with the duty cycle and offset of such waveforms being adjusted by controller.

Analyte sensor 390 comprises a device that receives product fluid, carrying the extracted target analyte, from product output passage 52. Analyte sensor 390 comprises a sensing device senses one or more characteristics of the product fluid and/or target analyte. In one implementation, analyte sensor 390 comprises a surface enhanced illumination (SEL) device. In one implementation, analyte sensor 390 comprises a surface enhanced Raman spectroscopy (SERS) device. In other implementations, analyte sensor 390 may comprise other analyte testing or sensing devices. In other implementations, analyte sensor 390 may be omitted.

Figure 5:
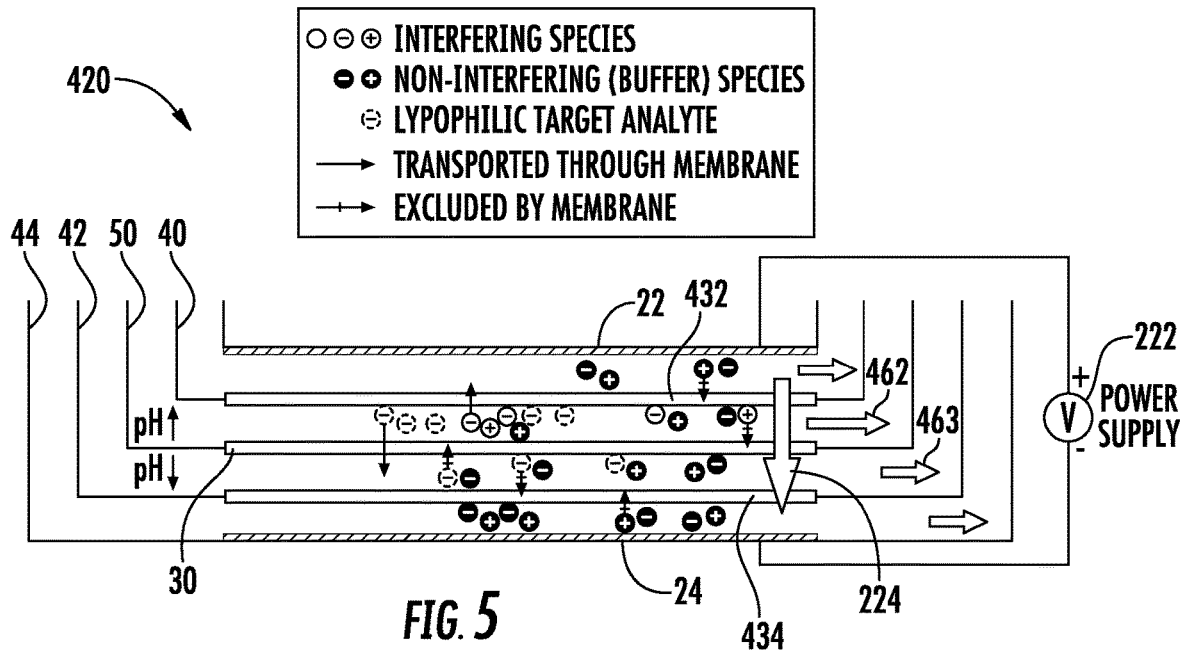
FIG. 5 is a schematic diagram of another example analyte extraction system.

FIG. 5 schematically illustrates analyte extraction system 420, another example of analyte extraction system 20. System 420 is similar to system 320 described above except the supply of power to electrodes 22 and 24 is reversed such that electrode 22 serves as the anode while electrode 24 serves as the cathode and except that system 420 is specifically illustrated as comprising anion exchange membranes 432 and 434 in place of membranes 32 and 34, respectively.

Those components or elements that correspond to components or elements of system 320 are numbered similarly. Although not specifically illustrated, system 420 additionally comprises sample fluid supply 370, pump 372, additive supply 374, product fluid supply 376, pump 378, additive supply 380, controller 382, electrodes 384, 36, controller 388 and analyte sensor 390 shown and described above with respect to system 320.

FIG. 5 illustrates one example target analyte extraction process that may be carried out by system 420. In the example illustrated, neutral lipophilic species or analyte is extracted from sample fluid 462 rich in interfering ionic species. Anion exchange membrane 432 is located between the buffer solution contained in fluid passage 40 and the sample fluid 462 contained in sample input passage 50. Anion exchange membrane 434 is located between the buffer solution contained in fluid passage 44 and product fluid 463 contained in product output passage 52. In the illustrated, sample fluid 462 is mixed with an alkaline buffer, such as through additive source 374, to provide sample fluid 462 with a high pH. As a result, most of the interfering species, such as phospholipids and proteins, are negatively charged and migrate towards the anode. The target analyte diffuses across supported liquid membrane 30 as it is more soluble in the solvent of supported liquid membrane 30.

In the example illustrated, to enhance target analyte transfer to the product fluid 463, the pH of the product fluid 463 is established so that the target analyte becomes positively charged in the product fluid 463. As a result, the target analyte becomes less lipophilic in the product fluid 463 and has a reduced ability to diffuse back through the solvent of the supported liquid membrane 30. The target analyte is enriched in the product fluid 463. Anion exchange membrane 434 inhibits transfer of the target analyte into buffer solution 464 within fluid passage 44.

Figure 6:
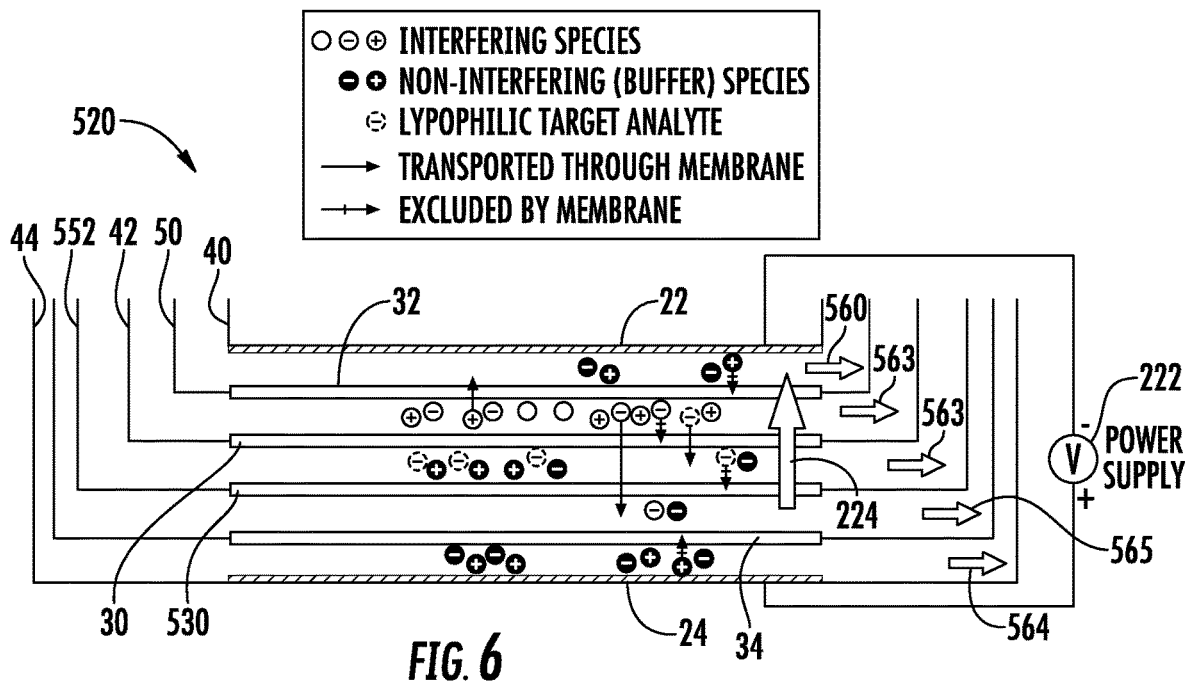
FIG. 6 is a schematic diagram of another example analyte extraction system.

FIG. 6 schematically illustrates analyte extraction system 520, another example of analyte extraction system 20. System 520 is similar to system 320 described above except that system 520 is specifically illustrated as additionally comprising supported liquid membrane 530 and waste fluid passage 552. Those components or elements that correspond to components or elements of system 320 are numbered similarly. Although not specifically illustrated, system 520 additionally comprises sample fluid supply 370, pump 372, additive supply 374, product fluid supply 376, pump 378, additive supply 380, controller 382, electrodes 384, 36, controller 388 and analyte sensor 390 shown and described above with respect to system 320.

Supported liquid membrane 530 is similar to supported liquid membrane 30 except that supported liquid membrane 530 contains a different organic phase or solvent providing different extraction characteristics. Supported liquid membrane 530 is located between product output passage 52 and membrane 34. Supported liquid membrane 530 is located between the product fluid 563 within product output passage 552 and waste fluid 565 within waste fluid passage 552. Supported liquid membrane 530 further filters out undesired species from the product fluid 563 within product output passage 552.

FIG. 6 illustrates one example target analyte extraction process that may be carried out by system 520. In the example illustrated, system 520 extracts an anionic lipophilic analyte from an aqueous sample fluid 562 rich in (non-lipophilic) small salt ions (e.g., sodium, potassium and chloride ions) (interfering species). Buffer solutions 560 and 564 each contain various non-interfering (buffer) species. In the example illustrated, the pH of the buffer fluid or solutions 560 and 564 as well as product fluid 563 is alkaline.

Because the pushing electrode 22 is a cathode, it electrolyzes water, producing hydroxide ions and hydrogen. Buffer solution 560, flowing within fluid passage 40, maintains the pH. Buffer solution 60 carries dissolved hydrogen generated on the surface of electrode 22 to reduce bubbles which would interfere with extraction. The flow rate of buffer solution 560 is tuned such that the capacity of buffer solution 560 to carry away dissolved oxygen and to buffer the generated hydroxide is not overcome.

As further shown by FIG. 6, membrane 32 further inhibits the passage of anions to sample fluid 562 within sample fluid passage 50. As a result, even if the buffer provided by buffer fluid 560 is defeated, membrane 32 inhibits hydroxide generated and electrode 22 from entering product fluid 563 within product output passage 52. At the same time, cations from the sample fluid 562 may freely pass through membrane 32 to balance the generated hydroxide and provide net neutrality in the buffer solution 560 within fluid passage 40.

The lipophilic anionic analyte within sample fluid 562 is driven by the electric field 224 through supported liquid membrane 30 into product fluid passage 52 and product fluid 563. Because of its lipophilic nature, the lipophilic anionic analyte is able to cross the lipophilic solvents inside the supported liquid membrane. Small non-lipophilic ions, such as chloride, are enabled to cross membrane 30 and remain in the sample fluid 562 within sample fluid passage 52.

In product fluid 563 within product output passage 52, the target analyte is further pulled towards the pulling electrode 24 (anode), but is inhibited from entering buffer solution 564 within fluid passage 44 by supported liquid membrane 530. As a result, the lipophilic target analyte concentrates in the product fluid 563 flowing through the product output passage 52. In one implementation, the flow rate of product fluid 563 through product output passage 52 is significantly slower than the flow rate of sample fluid 562 flowing within sample fluid passage 552 to further concentrate the target analyte. As with the flow of buffer solution 560, the flow of buffer solution 564 is tuned such that the capacity of buffer solution 564 to carry away dissolved gases from the electrode 24 and to provide a buffer is not overcome.

Figure 7:
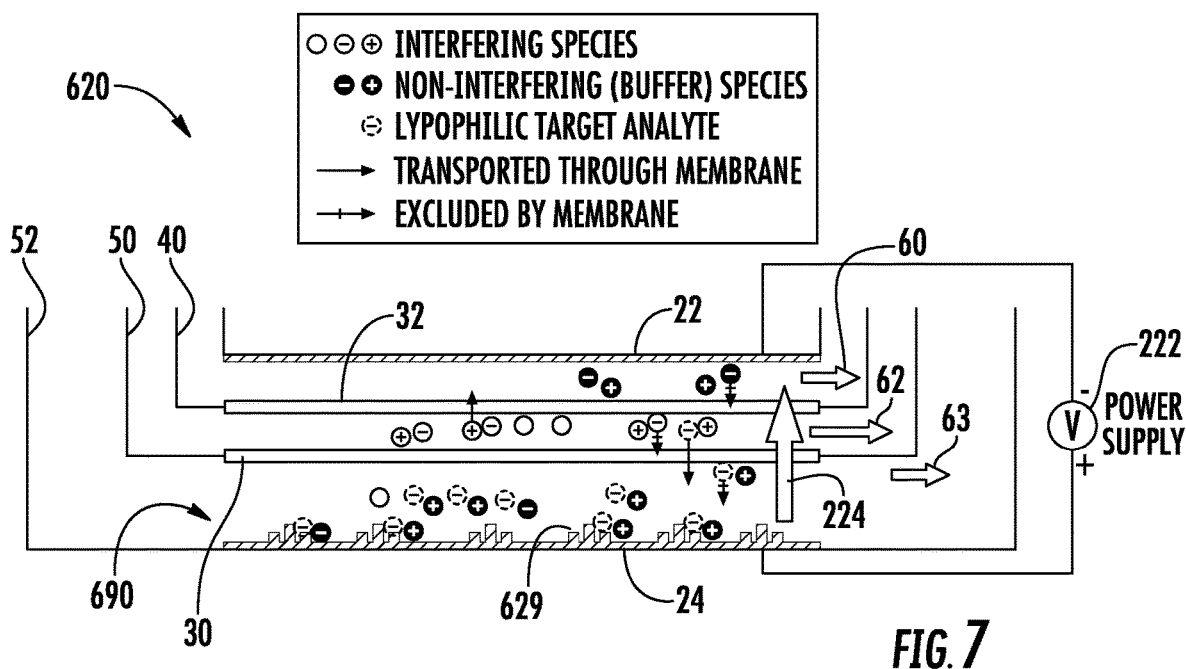
FIG. 7 is a schematic diagram of another example analyte extraction system.

FIG. 7 schematically illustrates analyte extraction system 620, another example of analyte extraction system 20. System 620 is similar to system 320 described above except that system 620 omits membrane 34 and fluid passage 44 while incorporating analyte sensor 690 within product output passage 52. Those components or elements that correspond to components or elements of system 320 are numbered similarly. Although not specifically illustrated, system 620 additionally comprises sample fluid supply 370, pump 372, additive supply 374, product fluid supply 376, pump 378, additive supply 380, controller 382, electrodes 384, 36, controller 388 and analyte sensor 390 shown and described above with respect to system 320.

Analyte sensor 690 comprises a surface enhanced luminescence structures 692. Structures 692 serve as a stage upon which the extracted target analyte deposits, wherein the SEL structure 692 enhances the intensity of the radiation scattered or reemitted by the analyte. Structure 692 may enhance the amount of radiation or the number of photons that are scattered or re-emitted by the analyte upon being impinged by radiation from a radiation source. In one implementation, structure 692 comprises an SEL structure or a group of SEL structures within product output passage 52 upon which and about the extracted target analyte contacts.

In one implementation, the SEL structures comprise enhanced fluorescence spectroscopy structures or surface enhanced Raman spectroscopy (SERS) structures. Such structures may include a metal surface or structure, wherein interactions between the analyte and the metal surface cause an increase in the intensity of the Raman-scattered radiation. Such metal surfaces may include a roughened metal surface, such as periodic gratings. In another implementation, such metal surfaces may comprise assemble nanoparticles. In some implementations, such metal surfaces may comprise metal islands. In one implementation, such metal islands comprise flexible columnar supports such as pillars, needles, fingers, particles or wires. In some implementations, the flexible columnar structures may include a metal cap or head upon which an analyte may be deposited. In some implementations, such columnar structures are formed from materials and/or are dimensioned so as to bend or flex towards and away from one another in response to applied electric fields. In some implementations, the SERS structures are movable and are self-actuating, wherein such columnar structures bend or flex towards one another in response to micro-capillary forces so as to self-organize, wherein such bending facilitates close spacing between the structures for greater scattered radiation intensity.

In some implementations, the columnar structures are electrically conductive such that the columnar structures and/or their metal caps or heads provide distinct charging points intensifying the generated electric field at distinct points to enhance attraction of the charged ions of the analyte to the columnar structures of structure 692. For example, in some implementations, the columnar structures are formed from an electrically conductive polymer such as Poly(3,4-ethylenedioxythiophene) or PEDOT (or sometimes PEDT), a conducting polymer based on 3,4-ethylenedioxy-thiophene or EDOT monomer. In one implementation, the SEL or SERS structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$. In yet other implementations, such columnar structures may be formed from non-electrically conductive materials, such as non-electrically conductive polymers, or may be formed from metal materials, such as wire filaments or the like.

In the example illustrated, the SEL structure is formed upon it as part of electrode 24. The electric field provided by electrode 24 drives the extracted target analyte towards the surface of the SEL structure, such as the surface of an SERS structure. As a result, binding of the target analyte to the SEL structure is enhanced to improve the sensitivity of the SEL structure. In some implementations, system 620 may additionally incorporate an evaporator and/or an on-chip, flat lens/detector for sensing or analyzing the extracted target analyte.

Figure 8:
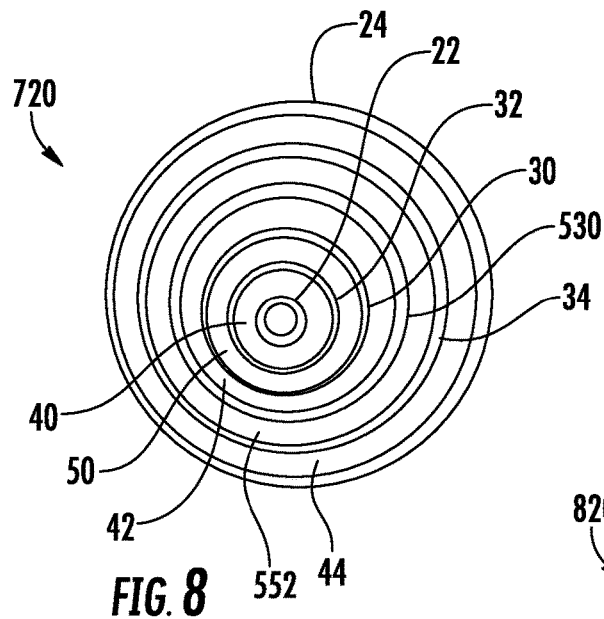
FIG. 8 is a schematic diagram of another example analyte extraction system.

Although analyte extraction systems 20, 220, 320, 420, 520 and 620 are illustrated as part of or utilizing a flat sheet supported liquid membrane 30, in other implementations, extraction systems 20, 220, 320, 420, 520 and 620 may alternatively utilize a hollow tubular or cylindrical supported liquid membrane, wherein the electrodes and membranes of extraction systems 20, 220, 320, 420, 520 and 620 arranged as multiple concentric nested tubes. FIG. 8 illustrates extraction system 720, another example extraction system 20. Extraction system 720 is similar to extraction system 520 except that the electrodes and membranes are tubular and concentrically nested. Those components or elements of system 720 which correspond to components or elements of systems 20, 220, 320, 420, 520 and 620 are numbered similarly. Although not specifically illustrated in FIG. 8, system 720 additionally comprises sample fluid supply 370, pump 372, additive supply 374, product fluid supply 376, pump 378, additive supply 380, controller 382, electrodes 384, 36, controller 388 and analyte sensor 390 shown and described above with respect to system 320.

Figure 9:
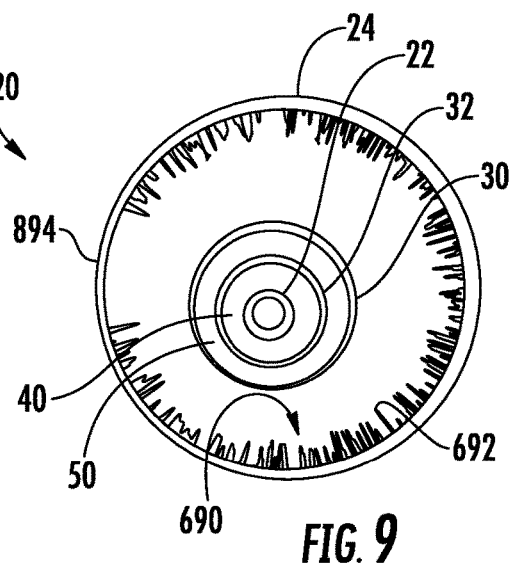
FIG. 9 is a schematic diagram of another example analyte extraction system.

FIG. 9 illustrates extraction system 820, another example extraction system 20. Extraction system 820 is similar to extraction system 620 except that the electrodes and membranes are tubular and concentrically nested. Those components or elements of system 820 which correspond to components or elements of systems 20, 220, 320, 420, 520 and 620 are numbered similarly. Although not specifically illustrated in FIG. 9, system 820 additionally comprises sample fluid supply 370, pump 372, additive supply 374, product fluid supply 376, pump 378, additive supply 380, controller 382, electrodes 384, 36, controller 388 and analyte sensor 390 shown and described above with respect to system 320. In one implementation, the target analyte upon the structures 692 is illuminated or irradiated through a transparent portion or window 894 provided in the layer supporting or providing electrode 24. In other implementations, the target analyte upon structures 692 may be illuminated or irradiated in other fashions.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An analyte extraction system comprising:
   a first electrode;
   a second electrode to cooperate with the first electrode to form an electric field therebetween;
   a supported liquid membrane between the first electrode and the second electrode;
   an exchange membrane between the first electrode and the supported liquid membrane;
   a buffer fluid passage between the first electrode and the exchange membrane;
   a sample input passage between and directly adjacent to each of the exchange membrane and the supported liquid membrane;
   a product output passage between the second electrode and the supported liquid membrane;
   a product fluid; and
   a product fluid source to supply the product fluid to the product output passage, the product fluid having a pH established such that a target analyte in a sample supplied through the sample input passage becomes positively charged in the product fluid to become less lipophilic in the product fluid so as to have a reduced ability to diffuse back through the solvent of the supported liquid membrane.

2. The analyte extraction system of claim 1 further comprising:
a second exchange membrane between the second electrode and the supported liquid membrane; and
a second fluid passage between the second electrode and the second exchange membrane.

3. The analyte extraction system of claim 2 further comprising:
a second supported liquid membrane between the supported liquid membrane and the second exchange membrane; and
a waste fluid passage between the second supported liquid membrane and the second electrode.

4. The analyte extraction system of claim 1 further comprising:
a first pump to move a sample fluid through the sample input passage;
a second pump to move a product fluid through the product output passage; and
a controller to control the relative rates at which the sample fluid is moved through the sample input passage and at which the product fluid is moved through the product output passage to selectively control a concentration of a target in the product fluid.

5. The analyte extraction system of claim 1 further comprising:
a controller configured to output control signals that cause application of an alternating current electrical field with a DC offset, with a waveform tuned to produce vortices and oscillating flow orthogonal to the liquid supported membrane.

6. The analyte extraction system of claim 1 further comprising a controller to selectively adjust a magnitude, frequency and waveform of an oscillating electric field formed by the first electrode and the second electrode.

7. The analyte extraction system of claim 1 further comprising:
a sample fluid source to supply a sample fluid to the sample input passage; and
an additive source to supply an additive to the sample fluid; and
a controller to output control signals causing selective adjustment of supply of the additive to the sample fluid to selectively adjust a chemistry of the sample fluid.

8. The analyte extraction system of claim 1 further comprising:
an additive source to supply an additive to the product fluid; and
a controller to output control signals causing selective adjustment of supply of the additive to the product fluid to selectively adjust a chemistry of the product fluid.

9. The analyte extraction system of claim 1, wherein the supported liquid membrane comprises one of an organic phase and a solvent, the analyte extraction system further comprising:
a third electrode and a fourth electrode; and
a controller programmed to output control signals causing the third electrode and the fourth electrode to form an electric field therebetween that is parallel to a major dimension of the supported liquid membrane, the electric field having characteristics so as to remove said one of the organic phase and the solvent from the supported liquid membrane.

10. The analyte extraction system of claim 3, wherein the second supported liquid membrane is between the supported liquid membrane and the second exchange membrane and wherein the product output passage is between and directly adjacent to each of the supported liquid membrane and the second supported liquid membrane.

11. The analyte extraction system of claim 1 further comprising:
an additive source to supply an additive to the product fluid; and
a controller to output control signals causing selective adjustment of supply of the additive to the product fluid to selectively adjust a chemistry of the product fluid.

12. The analyte extraction system of claim 1 further comprising:
an analyte sensor within the product output passage, the analyte sensor being sandwiched between the second electrode and the supported liquid membrane, wherein the analyte sensor comprises a surface enhanced Raman spectroscopy sensor and wherein one of the first electrode and the second electrode is transparent.

13. An analyte extraction system comprising:
a first electrode;
a second electrode to cooperate with the first electrode to form an electric field therebetween;
a supported liquid membrane between the first electrode and the second electrode;
an exchange membrane between the first electrode and the supported liquid membrane;
a buffer fluid passage between the first electrode and the exchange membrane;
a sample input passage between and directly adjacent to each of the exchange membrane and the supported liquid membrane;
a product output passage between the second electrode and the supported liquid membrane, wherein the supported liquid membrane comprises one of an organic phase and a solvent;
a third electrode and a fourth electrode; and
a controller programmed to output control signals causing the third electrode and the fourth electrode to form an electric field therebetween that is parallel to a major dimension of the supported liquid membrane, the electric field having characteristics so as to remove said one of the organic phase and the solvent from the supported liquid membrane.

14. The analyte extraction system of claim 13 further comprising:
a second exchange membrane between the second electrode and the supported liquid membrane; and
a second fluid passage between the second electrode and the second exchange membrane.

15. The analyte extraction system of claim 14 further comprising:
a second supported liquid membrane between the supported liquid membrane and the second exchange membrane; and
a waste fluid passage between the second supported liquid membrane and the second electrode.

16. The analyte extraction system of claim 13 further comprising:
a first pump to move a sample fluid through the sample input passage;

a second pump to move the product fluid through the product output passage; and the controller to control the relative rates at which the sample fluid is moved through the sample input passage and at which the product fluid is moved through the product output passage to selectively control a concentration of a target in the product fluid.

17. The analyte extraction system of claim 13, the controller to output control signals that cause application of an alternating current electrical field with a DC offset, with a waveform tuned to produce vortices and oscillating flow orthogonal to the liquid supported membrane.

18. The analyte extraction system of claim 13, the controller to selectively adjust a magnitude, frequency and waveform of an oscillating electric field formed by the first electrode and the second electrode.

19. The analyte extraction system of claim 13 further comprising:
a sample fluid source to supply a sample fluid to the sample input passage; and
an additive source to supply an additive to the sample fluid; and
the controller to output control signals causing selective adjustment of supply of the additive to the sample fluid to selectively adjust a chemistry of the sample fluid.

20. The analyte extraction system of claim 13 further comprising:
a product fluid source to supply a product fluid to the product output passage;
an additive source to supply an additive to the product fluid; and
the controller to output control signals causing selective adjustment of supply of the additive to the product fluid to selectively adjust a chemistry of the product fluid.

21. The analyte extraction system of claim 15, wherein the second supported liquid membrane is between the supported liquid membrane and the second exchange membrane and wherein the product output passage is between and directly adjacent to each of the supported liquid membrane and the second supported liquid membrane.

22. The analyte extraction system of claim 13 further comprising:
an additive source to supply an additive to the product fluid; and
the controller to output control signals causing selective adjustment of supply of the additive to the product fluid to selectively adjust a chemistry of the product fluid.

23. The analyte extraction system of claim 13 further comprising:
an analyte sensor within the product output passage, the analyte sensor being sandwiched between the second electrode and the supported liquid membrane, wherein the analyte sensor comprises a surface enhanced Raman spectroscopy sensor and wherein one of the first electrode and the second electrode is transparent.

* * * * *